United States Patent
Boyd

(10) Patent No.: US 9,403,426 B1
(45) Date of Patent: Aug. 2, 2016

(54) RAIN SHIELD FOR VEHICLE PASSENGERS

(71) Applicant: Michael Stewart Boyd, Jupiter, FL (US)

(72) Inventor: Michael Stewart Boyd, Jupiter, FL (US)

( * ) Notice: Subject to any disclaimer, the term of this patent is extended or adjusted under 35 U.S.C. 154(b) by 0 days.

(21) Appl. No.: 14/810,114

(22) Filed: Jul. 27, 2015

Related U.S. Application Data

(63) Continuation-in-part of application No. 14/269,913, filed on May 5, 2014, now Pat. No. 9,090,153.

(51) Int. Cl.
*B60J 11/06* (2006.01)

(52) U.S. Cl.
CPC ...................................... *B60J 11/06* (2013.01)

(58) Field of Classification Search
CPC .......... B60J 11/00; B60J 11/02; B60J 11/025; B60J 11/06
USPC ............... 296/99.1, 152; 160/370.21, 370.22, 160/370.23, 22, 23.1, 24
See application file for complete search history.

(56) References Cited

U.S. PATENT DOCUMENTS

| | | | |
|---|---|---|---|
| 2,426,113 A | 8/1947 | Northcutt | |
| 4,201,412 A | 5/1980 | Williams et al. | |
| 4,378,888 A | 4/1983 | Reed | |
| 4,389,817 A * | 6/1983 | Olberding | E05B 47/0002 49/163 |
| 4,807,920 A | 2/1989 | Fujiki et al. | |
| 4,848,827 A | 7/1989 | Ou | |
| 4,997,021 A | 3/1991 | Brutsaert | |
| 5,230,545 A | 7/1993 | Huang et al. | |
| 5,476,302 A | 12/1995 | Ronci | |
| 5,725,004 A | 3/1998 | Moulder | |
| 5,800,004 A | 9/1998 | Ackeret | |
| 6,019,414 A | 2/2000 | Pourciau, Sr. | |
| 6,044,856 A | 4/2000 | Cano | |
| 6,341,811 B1 | 1/2002 | Schoelkopf | |
| D492,640 S | 7/2004 | Greene et al. | |
| 6,948,766 B1 | 9/2005 | Capote et al. | |
| 7,086,684 B2 | 8/2006 | Glaser et al. | |
| 7,604,281 B1 | 10/2009 | Raynor | |
| 7,641,259 B2 | 1/2010 | Teshima et al. | |
| 7,819,458 B2 | 10/2010 | Raynor | |
| 8,240,323 B2 | 8/2012 | Lee | |
| 8,276,607 B2 | 10/2012 | Kim | |
| 8,387,640 B2 | 3/2013 | Kim | |
| 2003/0192581 A1 | 10/2003 | Chang | |
| 2007/0187043 A1* | 8/2007 | Heitel | E05F 15/63 160/22 |
| 2007/0241586 A1 | 10/2007 | Clark | |
| 2010/0078960 A1 | 4/2010 | Raynor | |

(Continued)

FOREIGN PATENT DOCUMENTS

JP 2009-234554 * 10/2009

*Primary Examiner* — Dennis H Pedder
(74) *Attorney, Agent, or Firm* — Nilay J. Choksi; Smith & Hopen, P.A.

(57) ABSTRACT

A motorized apparatus that provides protection from precipitation to a vehicle occupant upon entering or exiting the vehicle includes a housing secured to the vehicle roof so that it can be reached by a passenger seated within the vehicle. A housing base is secured to the vehicle roof. A hinge positioned at the leading end of the housing interconnects the housing base to a housing cover. The housing has a fully closed position when the housing cover fully engages the housing base and a fully deployed position when the cover is fully rotated with respect to the base. A sheet of waterproof material has a first end secured to an interior of the base and a second end secured to an interior of the cover. The sheet is folded when the housing is in the fully closed position and is unfolded when the housing is in the fully deployed position.

17 Claims, 17 Drawing Sheets

(56) References Cited

U.S. PATENT DOCUMENTS

2011/0010920 A1   1/2011   Raynor
2011/0240074 A1  10/2011   Kim
2012/0060345 A1   3/2012   Raynor

* cited by examiner

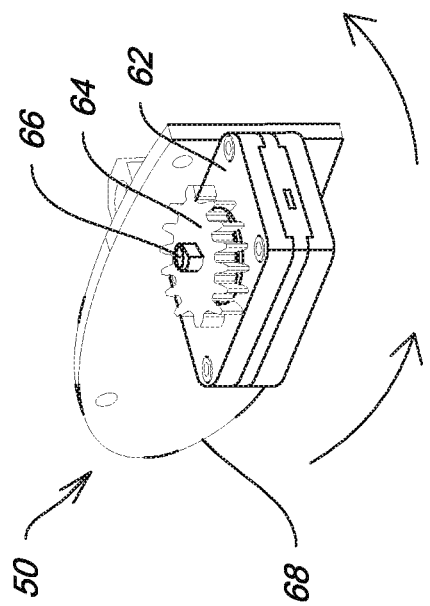
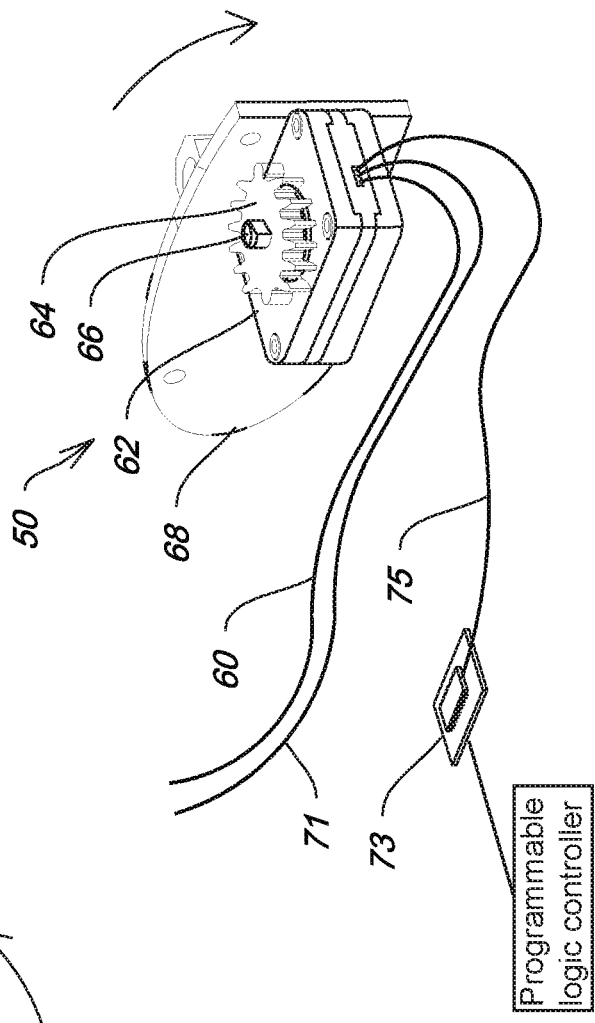
Fig. 12A
Fig. 12B

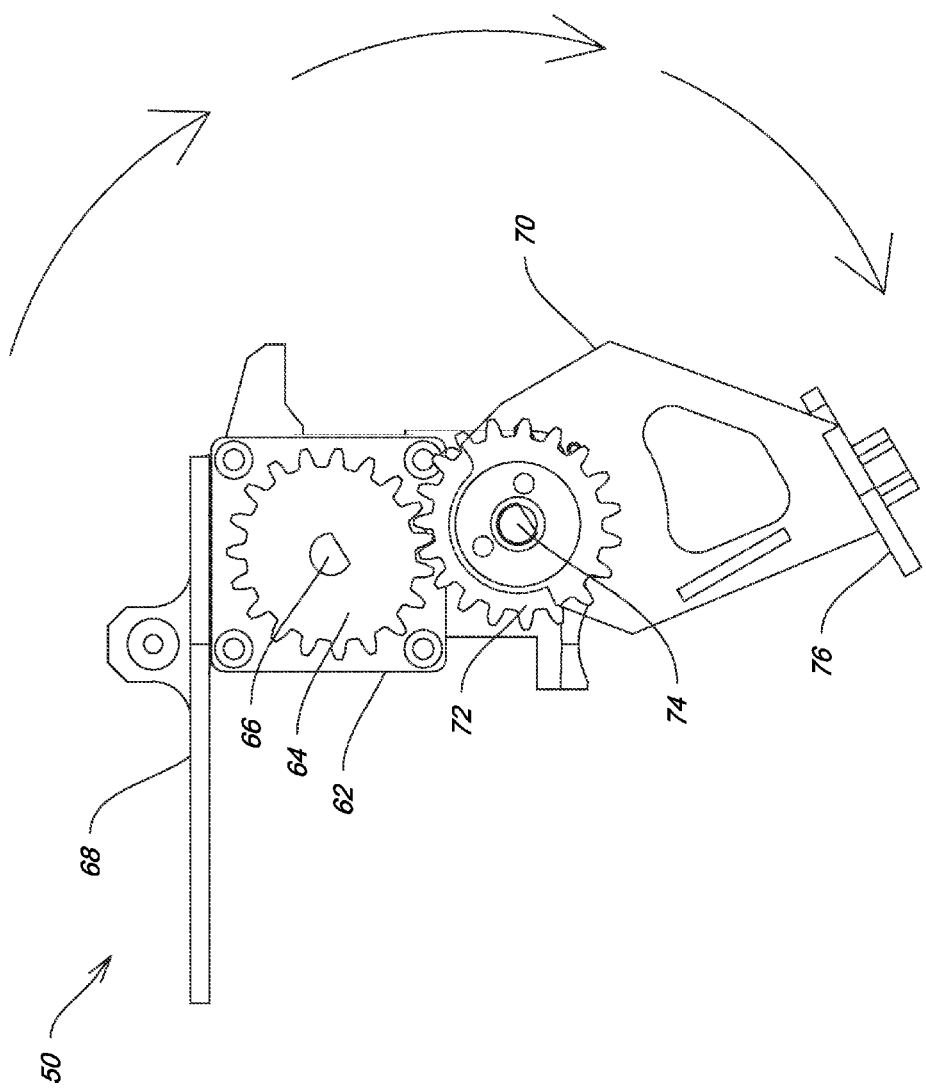

RAIN SHIELD FOR VEHICLE PASSENGERS

CROSS-REFERENCE TO RELATED APPLICATIONS

This nonprovisional application is a continuation-in-part of and claims priority to U.S. Nonprovisional patent application Ser. No. 14/269,913, entitled "Rain Shield for Vehicle Passengers", filed May 5, 2014 by the same inventor, now U.S. Pat. No. 9,090,153, the entirety of which is incorporated herein by reference.

BACKGROUND OF THE INVENTION

1. Field of the Invention

This invention relates, generally, to automotive accessories. More particularly, it relates to an umbrella-like structure that can be deployed when needed by a passenger in a vehicle.

2. Brief Description of the Prior Art

Most of the known umbrella-like devices that are attachable to vehicles have a first end anchored to the roof of the vehicle and a second end attached to a door. Accordingly, the umbrella-hike device deploys when the door is opened, even if no rain is falling. Some of these devices enable a passenger to disable the device prior to opening the doors so that the device remains un-deployed when the door opens.

One drawback of such devices is that they provide a rain shield only in the area swept out by the door when opened, i.e., the protection stops at the trailing edge of the door.

Another type of device provides a greater coverage area. Devices of this type are rather large and cover substantially all of a vehicle's roof. They are deployed in cantilever fashion so that they project from the roof, extending over the side of the vehicle and shielding an area larger than that of the door-connected shields.

The primary drawback of the large devices is that they are so large they cannot be provided for all four doors of a four-door vehicle. A secondary drawback is that their large size renders them unsightly. Moreover, they are strictly utilitarian structures with no aesthetic appeal.

Thus there is a need for an umbrella-like rain shield device that is small and which does not detract from the appearance of a vehicle to which it is mounted. The needed device should cover an area larger than the area swept out by an open door and it should be mountable over each door of a vehicle so that all passengers will enjoy rain protection when needed. However, in view of the art considered as a whole at the time the present invention was made, it was not obvious to those of ordinary skill in the art how the needed structure could be provided.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a device that protects vehicle occupants from rain or other forms of precipitation as they enter or leave the vehicle, providing ample dry space within which to close or deploy a conventional umbrella, is now met by a new, useful, and non-obvious invention.

The novel apparatus includes an elongate, streamlined housing having a leading end and a trailing end that correspond to a leading and trailing end of the vehicle. The housing has a longitudinal axis parallel to a longitudinal axis of the vehicle and is secured to the roof of the vehicle near an edge of the roof in proximity to a vehicle door.

The housing includes a hollow base and a hollow cover. The hollow housing base is secured to either the vehicle roof or to accessory rails on the roof. A hinge assembly is positioned at the leading end of the housing and performs the function of interconnecting the hollow housing cover and the hollow housing base to one another.

The housing has a fully closed position when the housing cover is fully engaged to the housing base and has a fully deployed position when the housing cover is fully rotated with respect to the housing base. A motor mechanism is positioned in communication with the hinge assembly for mechanically opening and closing the housing without any force needed from a user thereof vehicle occupant or passenger).

A sheet of waterproof material such as the material used in conventional umbrellas has a first end secured to an interior of the housing base and a second end secured to an interior of the housing cover. The sheet is in a folded or wound-up/coiled configuration when the housing is in its fully closed position and is fully unfolded or unwound when the housing is in its fully deployed position.

A latch may be secured to the trailing end of the housing cover, and a catch may be secured to the trailing end of the housing base. The housing is therefore held in its closed position when the first latch and catch releasably engage one another.

The latch and catch assembly may include a linear actuator (e.g., linear solenoid) for automatically engaging and disengaging the catch and latch. Further, the linear actuator can be in electrical communication with the motor mechanism, such that when the linear actuator is actuated, the motor mechanism is activated for opening/closing the housing.

If the actuator is a linear solenoid, the solenoid includes an internal spring and a piston coupled to each other. The spring has an extended position where the piston is also extended and a retracted position where the piston is also retracted. The spring has an equilibrium position in the extended position, so that when the spring is compressed, it is inherent biased toward extending back out. In this case, the latch may include a plunger that engages and extends through a precut aperture in the catch when the spring and piston are extended.

The motor mechanism may include a drive gear, and the hinge assembly may include a driven gear. The drive gear engages the driven gear when the motor mechanism is activated, such that when the drive gear engages and rotates the driven gear, the cover rotates between said fully open and closed positions. Additionally, the motor mechanism may include a stepper motor that can cause rotation and stopping of the cover at preset increments between the fully open position and the fully closed position.

The novel apparatus may further include a receiver that is electrically coupled to the motor mechanism for receiving a signal (wired or wirelessly) from a remote controller that is in communication with the receiver. The receiver may be a radiofrequency receiver that receives wireless radio signals, so that the housing can be opened and closed remotely.

In a separate embodiment, the novel apparatus can include any one or more, or even all, of the foregoing characteristics and features as described herein. The primary object of this invention is to provide a simple-to-operate rain shield for passengers entering or leaving a vehicle by providing them with an umbrella-like rain shield while a conventional umbrella is being opened or closed.

Another important object is to provide the rain shield in an aesthetically pleasing and aerodynamic form.

A more specific object is to provide a rain shield that is not limited to the space swept out by an open car door so that the protection extends beyond the trailing end of the door.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the Wowing detailed disclosure, taken in connection with the accompanying drawings, in which:

FIG. 12A is a perspective view of the motor mechanism and associated gear.

FIG. 12B is a view like FIG. 12A but also depicting the electrical connections as well as a circuit board with an embedded integrated circuit.

FIG. 13C is a top plan view of the novel hinge and motor mechanism when the novel apparatus is in its fully open position (e.g., open about one hundred sixty degrees (160°) relative to its fully closed position).

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Figure 1A:
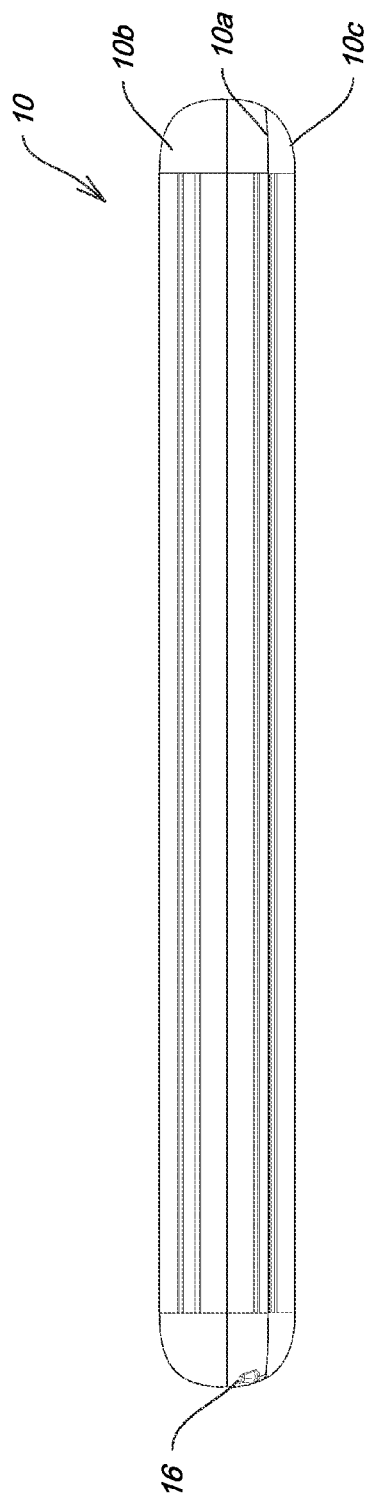
FIG. 1A is a top plan view of the novel structure when in its fully closed configuration.
Figure 1B:
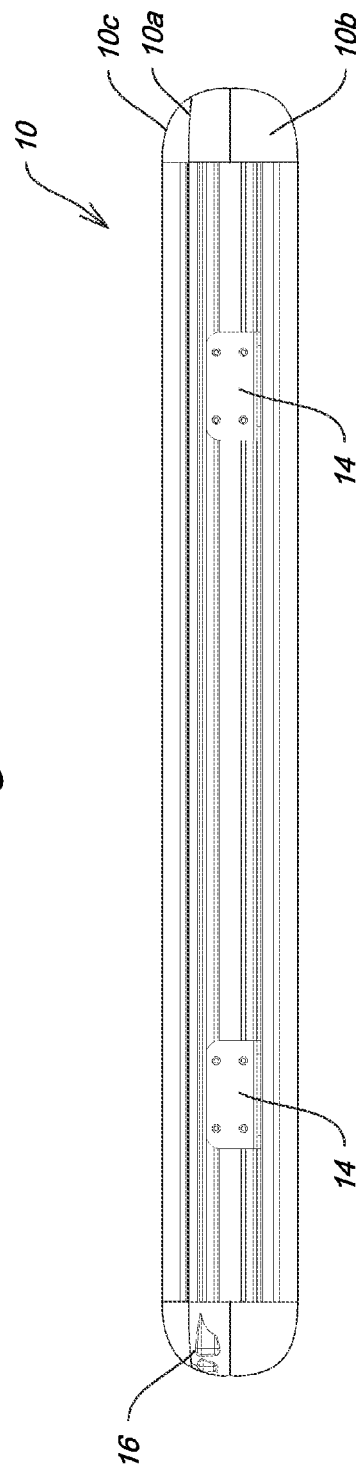
FIG. 1B is a bottom plan view thereof when in its fully closed configuration.

FIGS. 1A and 1B depict an illustrative embodiment of the novel structure which is denoted as a whole by the reference numeral 10. Parting line 10a denotes where housing base 10b having a hollow interior engages housing cover 10c which also has a hollow interior.

As depicted in FIG. 1B, mounting brackets 14, 14 are secured to base 10b by screws that are depicted but not numbered to avoid cluttering the drawings. Hinge 16 is positioned inside the hollow interior of base 10b adjacent parting line 10a, as depicted in FIGS. 1A and 1B.

Figure 2A:
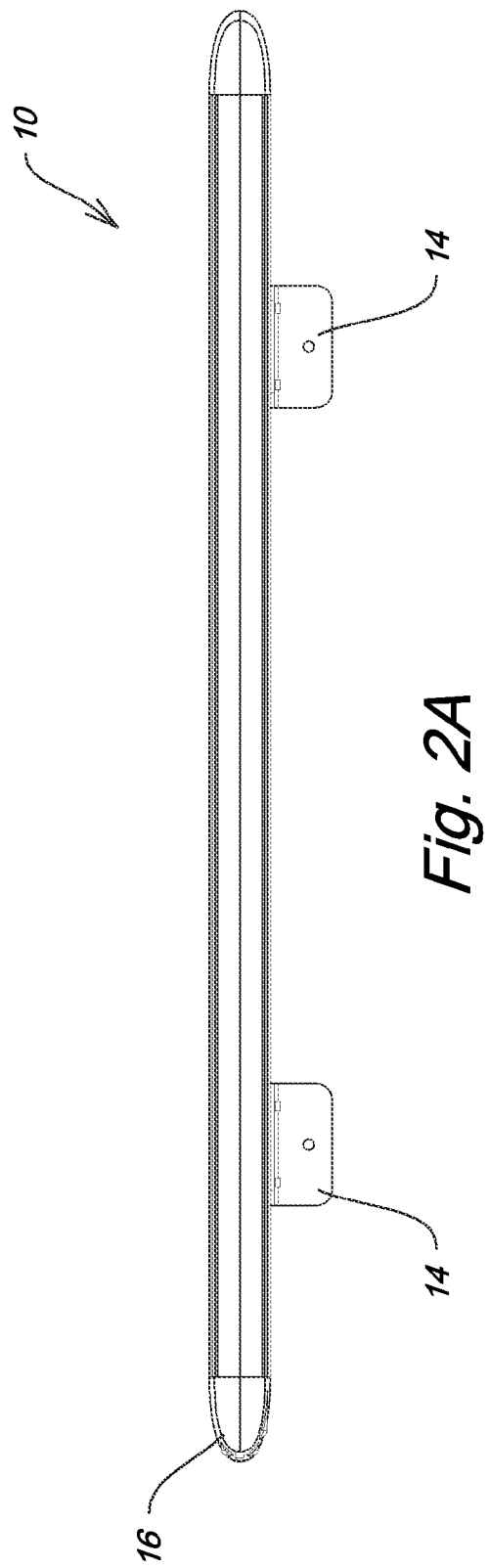
FIG. 2A is a side elevation view thereof when in its fully closed configuration.
Figure 2C:
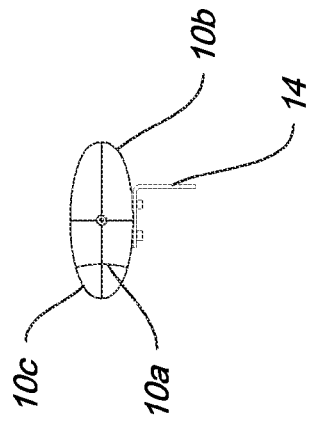
FIG. 2C is a second end view thereof when in its fully closed configuration.
Figure 2B:
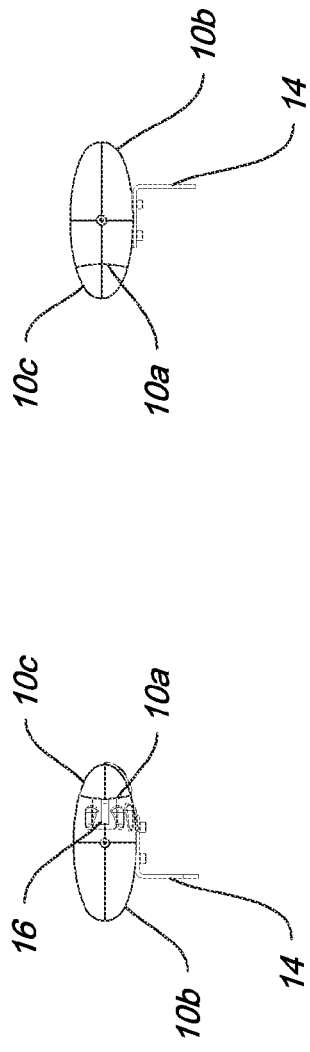
FIG. 2B is a first end view thereof when in its fully closed configuration.

The same parts are depicted the side elevation view of FIG. 2A and the end views of FIGS. 2B-2C.

Figure 3:
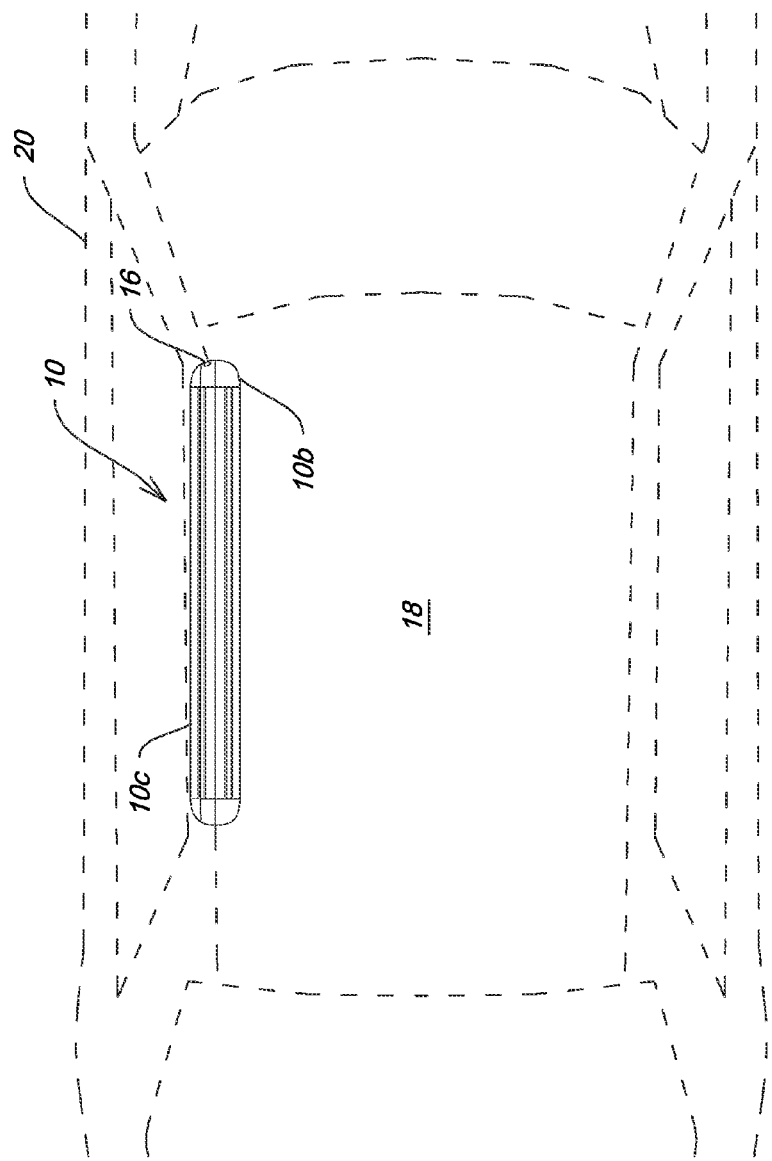
FIG. 3 is a top plan view depicting a location where the novel structure may be mounted.

Apparatus 10 has an aesthetically appealing, streamlined appearance and can be mounted on the roof of a vehicle in several different ways. If a vehicle is equipped with a roof rack, apparatus 10 can be secured to the roof rack. Many vehicles lacking roof racks include designated points or areas of the roof where holes for roof racks may be formed. Instead of forming openings at the designated points and mounting a roof rack thereto, followed by mounting apparatus 10 to the roof rack, the user may mount apparatus 10 directly to the roof as depicted in FIG. 3. Its longitudinal axis is parallel to the longitudinal axis of the vehicle and each apparatus is mounted on an edge of the roof in close proximity to a door so that a seated passenger can deploy or retract the novel rain shield without opening the door.

Base 10b is secured to roof 18 of vehicle 20 by mounting brackets 14, 14. Hinge 16 interconnects cover 10c to base 10b at the leading end of housing 10. The leading end of housing 10 corresponds to the leading end of the vehicle which is to the right as depicted in FIG. 3, and the trailing end of housing 10 corresponds to the trailing end of the vehicle which is to the left as depicted in FIG. 3.

Figure 4:
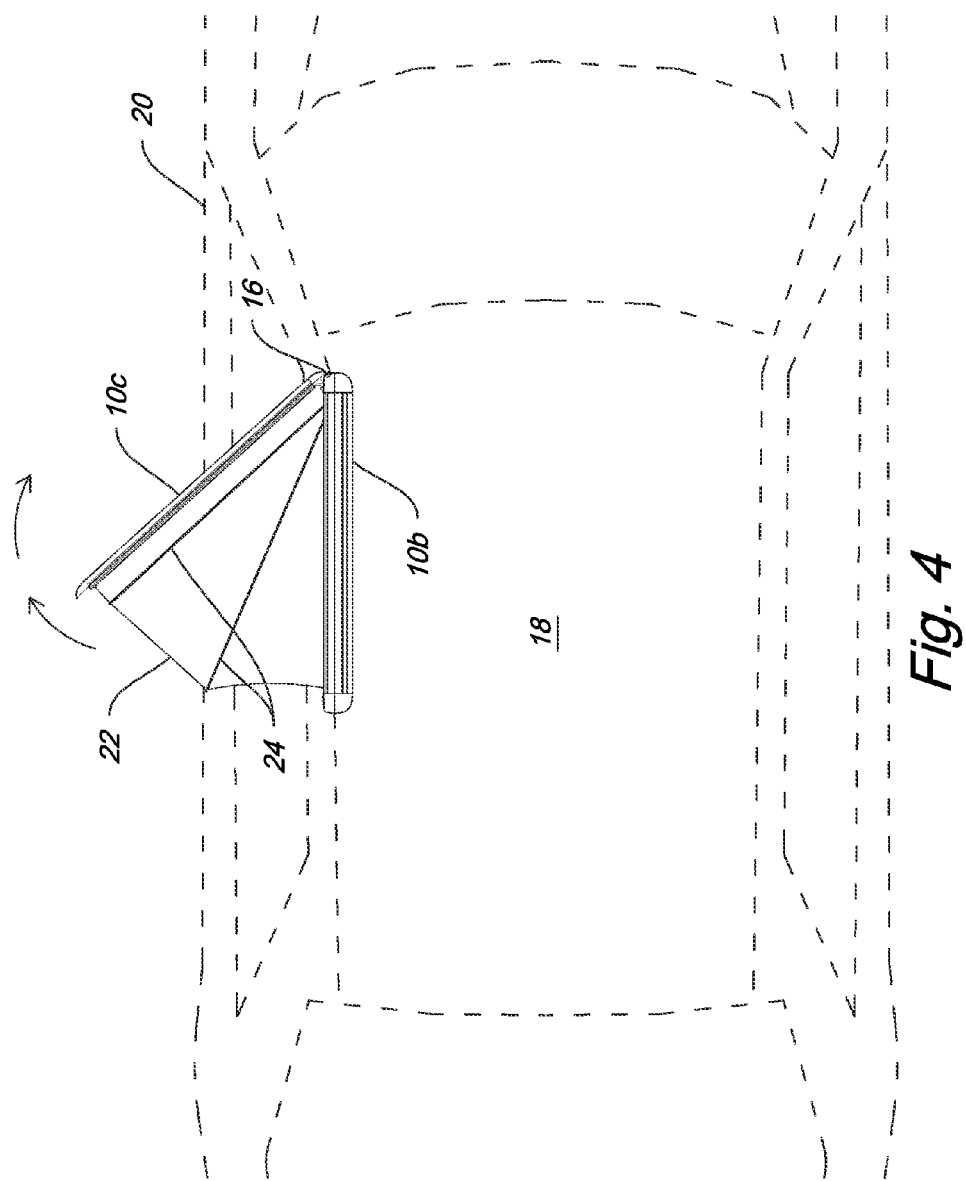
FIG. 4 is a view like that of FIG. 3 but depicting partial deployment of the novel structure.

FIG. 4 depicts housing 10 in a partially deployed configuration. The door remains closed, there being no part of the novel structure attached to a door. Fabric 22 unfolds or unwinds as cover 10c swings about hinge 16 in the direction of the un-numbered directional arrows. A first edge of fabric 22 is secured to a fixed position rod, not depicted in FIG. 4 but depicted in FIG. 10 as reference numeral 23a, disposed within the hollow interior of base 10b. A second edge of fabric 22 is secured to a fixed position rod, not depicted in FIG. 4 but depicted in FIG. 10 as reference numeral 23b, disposed within the hollow interior of cover 10c. The fabric between said first and second edges is supported from sagging by fabric support rods, collectively denoted 24, that are initially positioned within the hollow interior of base 10b and which deploy therefrom as cover 10c swings about hinge 16 as aforesaid. Alternatively, fabric support rods 24 may be initially positioned within the hollow interior of cover 10c and which deploy therefrom as cover 10c swings about hinge 16 as aforesaid.

In an alternative, undepicted embodiment, a first edge of the fabric is wound about an elongate rod that is mounted in base 10b for rotation about its longitudinal axis and a second edge of the fabric is secured to an elongate rod mounted in cover 10c. A torque spring may be attached to the base-mounted elongate rod and a latch may be employed to hold the cover in its open position. A latch release would enable the torque spring to return to its position of repose and cause re-winding of the fabric about the rotatably mounted elongate rod as the cover swings back to its closed position.

Figure 5:
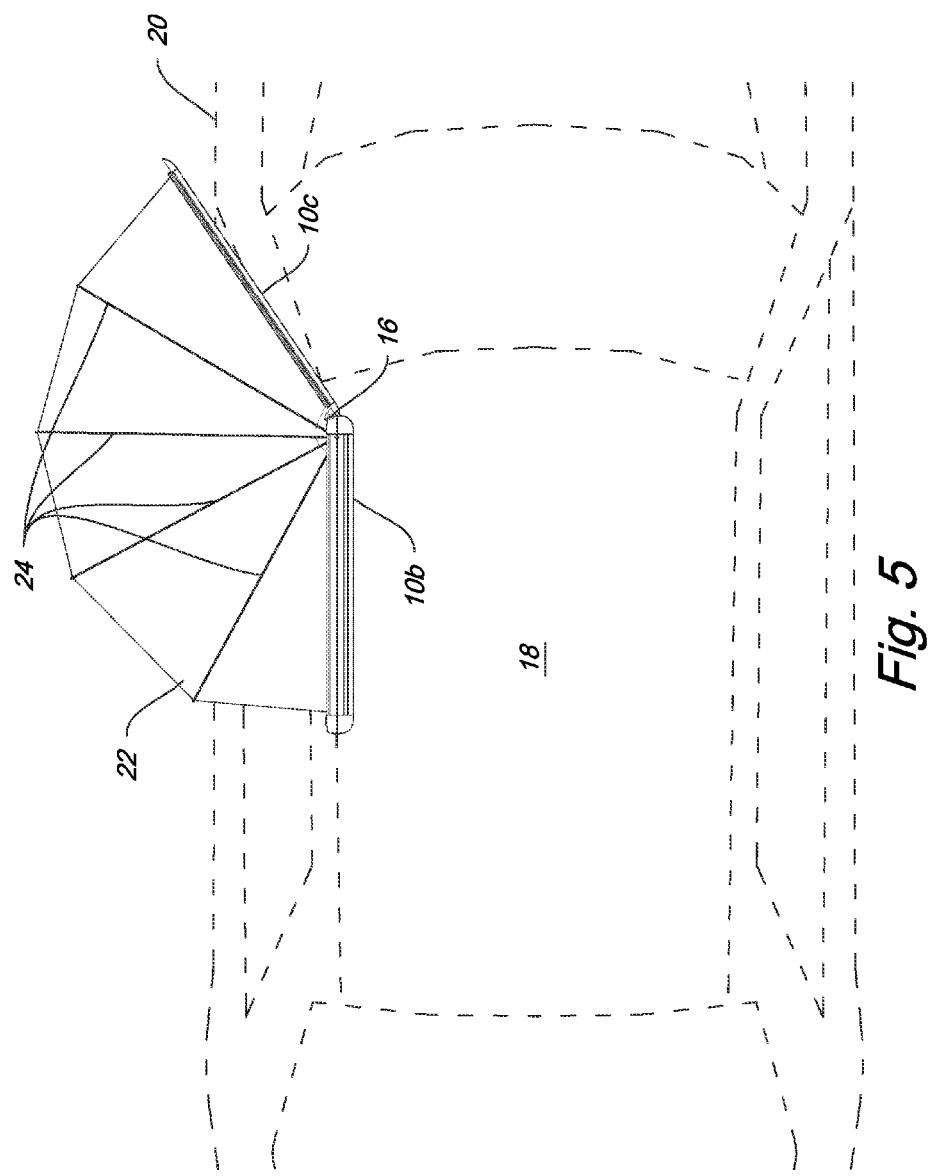
FIG. 5 is a view like that of FIG. 3 but depicting full deployment of the novel structure.

FIG. 5 depicts housing 10 in its fully deployed configuration and differs from FIG. 4 in that additional fabric support rods 24 are now deployed.

Figure 6:
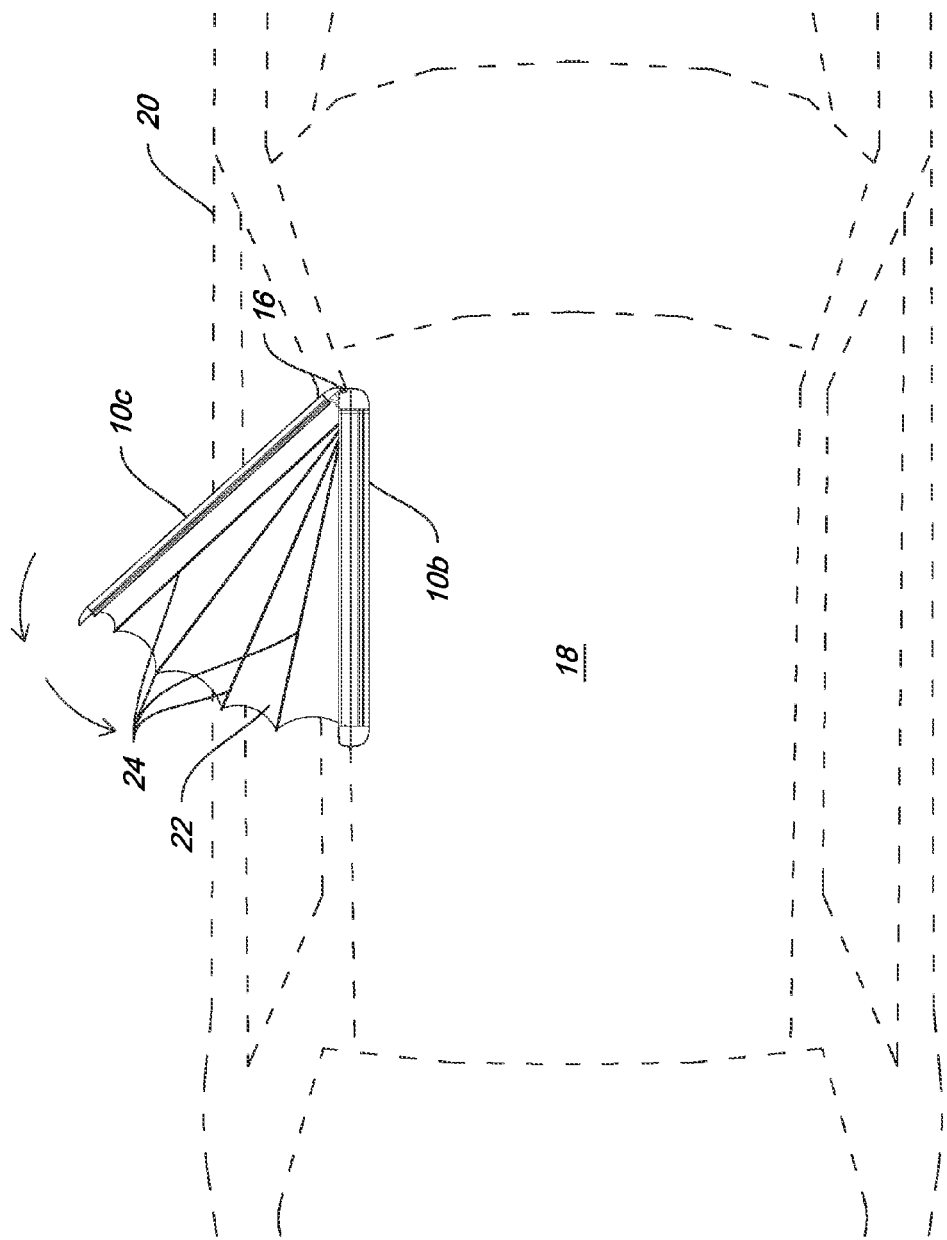
FIG. 6 is a view like that of FIG. 5 but depicting the novel structure as it is being returned to its housing.

FIG. 6 depicts the same parts as FIGS. 4 and 5 but the apparatus is now being closed, i.e., cover 10c is being swung about hinge 16 in the direction indicated by the un-numbered arrows.

Figure 7:
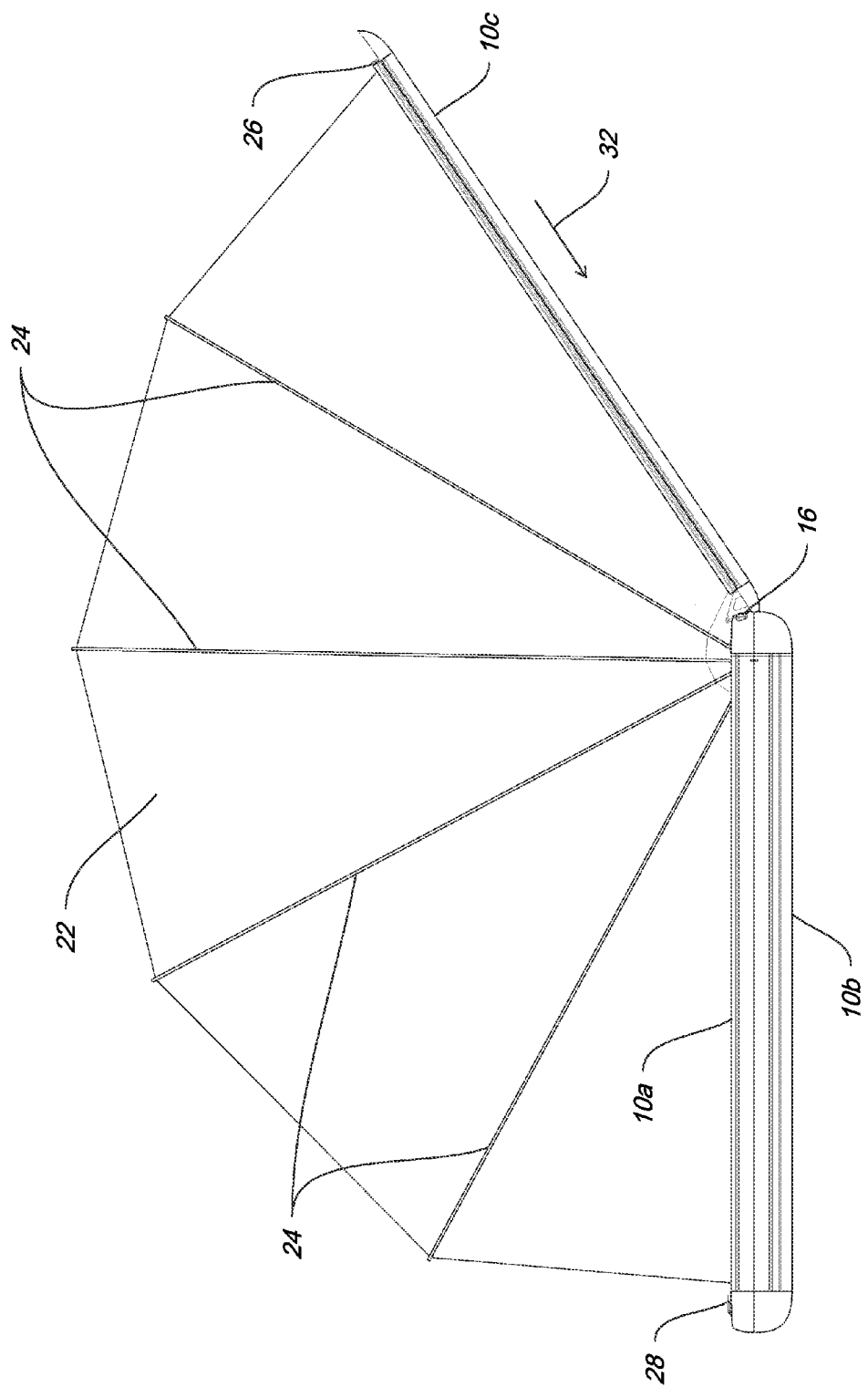
FIG. 7 is a top plan view depicting the structure in its fully deployed configuration.

FIG. 7 is similar to FIG. 5 in that it depicts fabric 22 in its fully deployed configuration. Latch 28 at the trailing end of cover 10c engages catch 26 at the trailing end of base 10b when housing 10 is fully closed.

Figure 8:
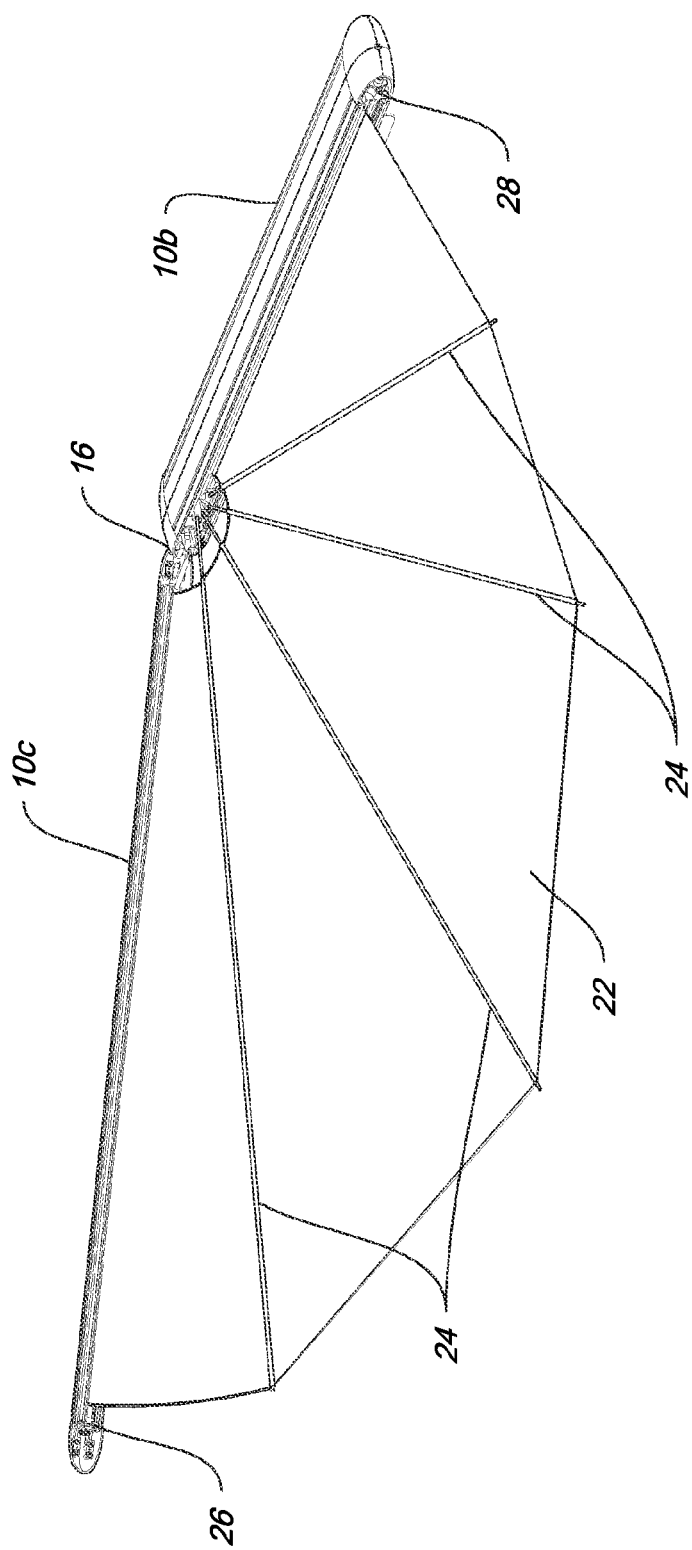
FIG. 8 is a perspective view depicting the rods that hold the fabric when in their fully deployed configuration.

FIG. 8 depicts the fully deployed configuration of housing 10.

Figure 9:
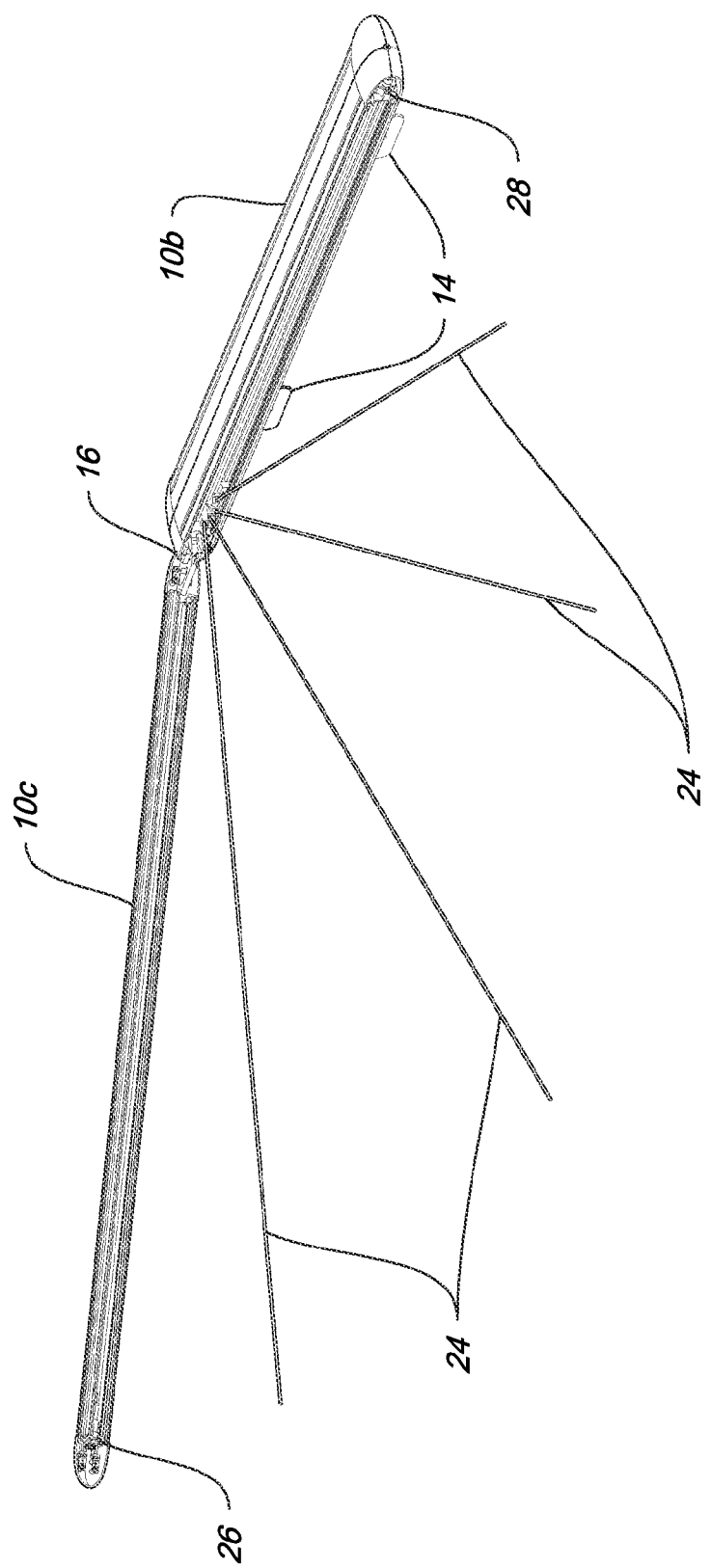
FIG. 9 is the same as FIG. 8 but without the fabric.

FIG. 9 depicts the fully deployed configuration of housing 10 with fabric 22 removed therefrom.

Figure 10:
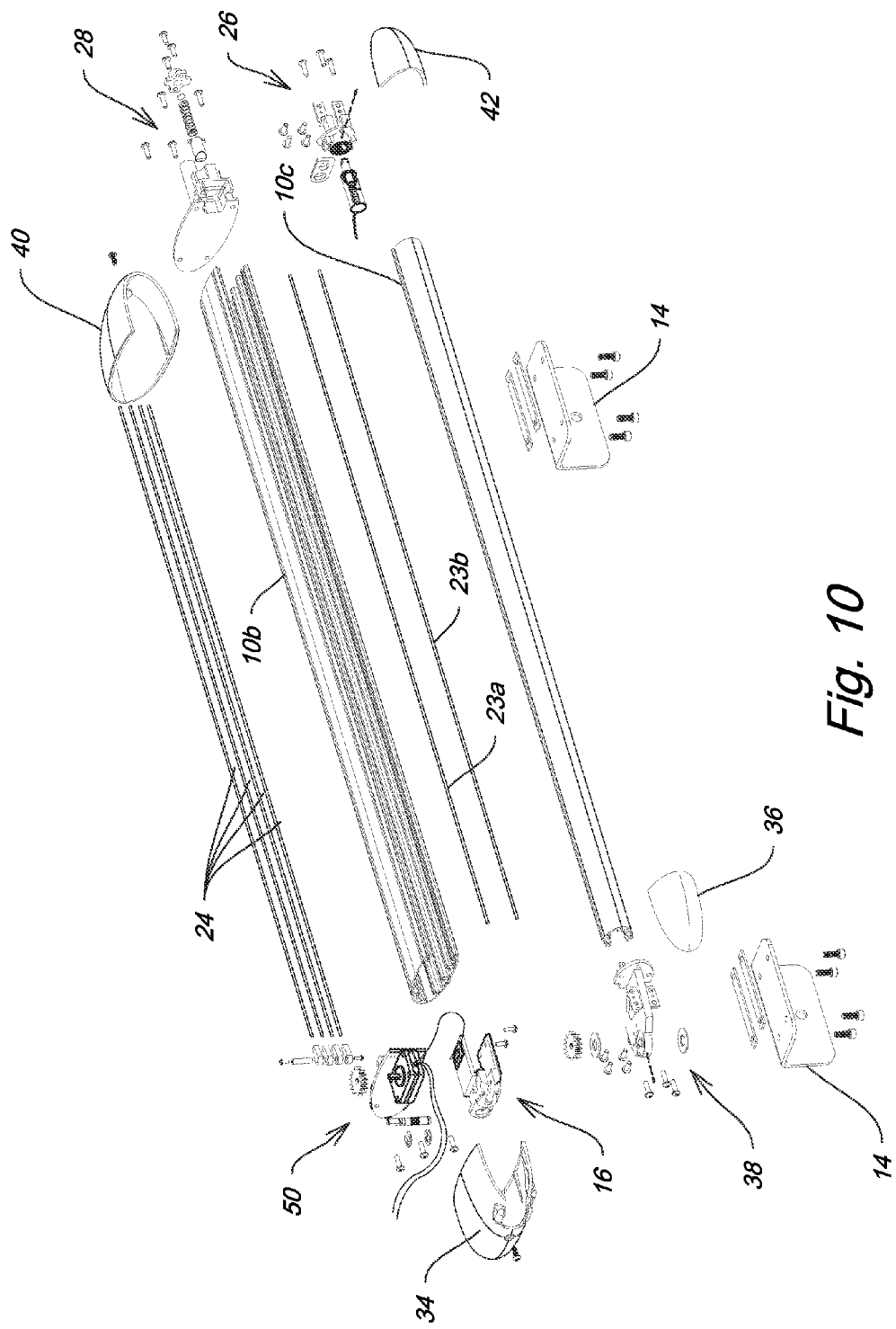
FIG. 10 is an exploded view depicting all of the parts of the preferred embodiment.

The exploded view of FIG. 10 depicts the parts in their unassembled configuration. A large number of complex parts, denoted hinge 16, together with another large number of complex parts, denoted hinge block 38, collectively form the hinge assembly but a conventional hinge assembly may be used as well. For purposes of clarity, hinge 16 and hinge block 38 are depicted about fifty percent (50%) larger than their true relative size. There are many types of conventional hinge assemblies that may be used and all of them are within the scope of this invention as is the complex hinge that is illustrated. Complex hinge assembly 16+38 is capable of holding cover 10c in any latched position via its motor mechanism (e.g., stepper motor, as will be discussed infra) as well, for example when cover 10c is about one-third open, when cover 10c is about two-thirds open, when cover 10c is fully open, and anything in between. Hinge assembly 16+38 is shown in further detail in FIGS. 13A-13C and will be further described as this specification continues. Motor 50 that powers and controls the opening and closing of cover 10c is shown in further detail in FIGS. 12A-12B and will be further described as this specification continues.

Still referring to FIG. 10, another large number of complex parts, denoted catch assembly 26, together with another large number of complex parts, denoted latch assembly 28, collectively form latch and catch assembly 26+28 that interconnect the respective trailing ends of base 10b and cover 10c when housing 10 is closed, though a conventional latch and catch assembly may be used as well to secure the respective trailing ends of base 10b and cover 10c to one another when housing 10 is closed. For purposes of clarity, catch 26 and latch 28 are also depicted about fifty percent (50%) larger than their true relative size. There are many types of conventional latch and catch mechanisms, including simple snaps and buckles, for example, that may be used and all of them are within the scope of this invention as is the complex latch and catch mechanism that is illustrated. Catch assembly 26 and latch assembly 28 are shown in further detail in FIGS. 11A-11C and gill be further described as this specification continues.

As seen in FIG. 10, base end cap 34 houses hinge 16 and motor 50, both of which enable cover 10c to have any stop point when fabric 22 being deployed or closed. Alternatively, cover 10c have a hinge mechanism that enables cover 10c to have stop points at one-third deployment, two-thirds deployment, and full deployment, as described in U.S. patent application Ser. No. 14/269,913. However, if one wishes to build an embodiment having no such stop positions, a simple, well-known hinge pin mechanism, not depicted, can be substituted for the complex mechanism.

Cover end cap 36 houses hinge block mechanism 38 which forms a part of hinge assembly 16+38. Base end cap 34 and cover end cap 36 abut one another and house hinge assembly 16+38 when housing 10 is fully assembled.

Similarly, at the opposite (trailing) end of the assembly, base end cap 40 houses latch assembly 28, and cover end cap 42 houses catch assembly 26. Base end cap 40 and cover end cap 42 abut one another and house latch and catch assembly 26+28 when housing 10 is fully assembled.

Figure 11A:
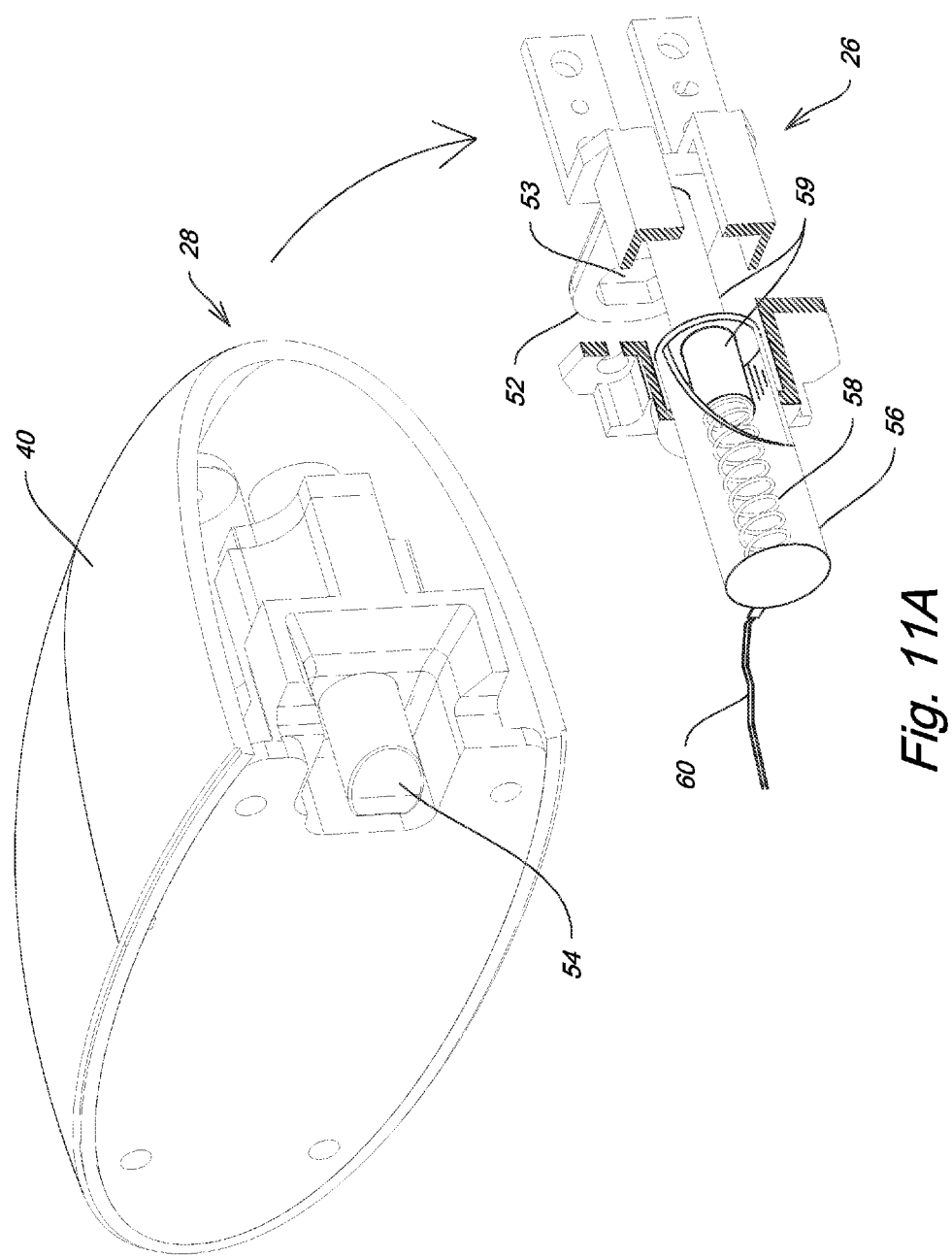
FIG. 11A is a side elevation view of a cutaway of the catch assembly, the latch assembly, and the solenoid connected to the catch assembly.
Figure 11B:
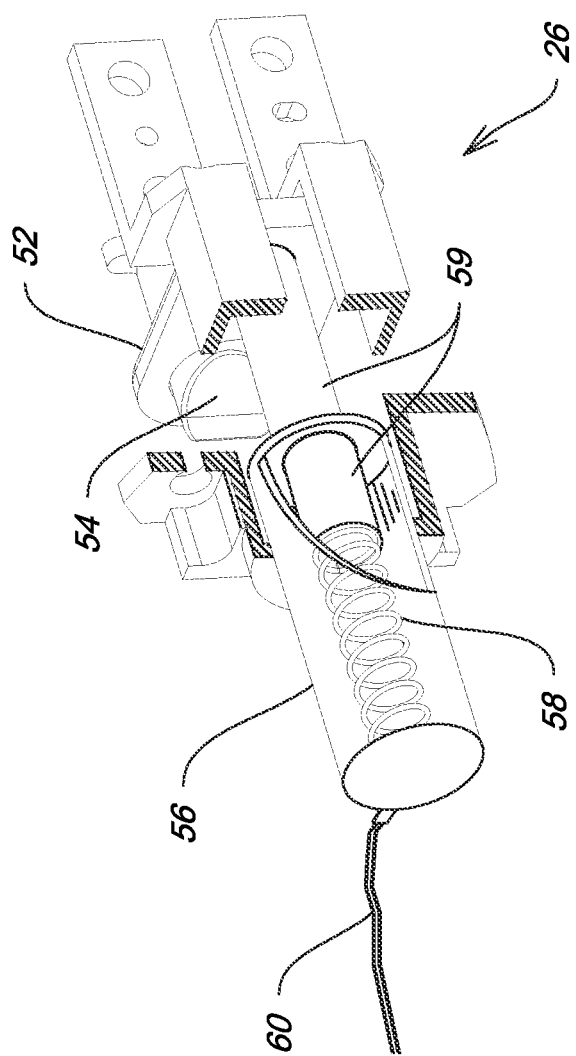
FIG. 11B depicts the solenoid in the default position with the plunger extended and the latch and the catch engaged (device is locked closed).
Figure 11C:
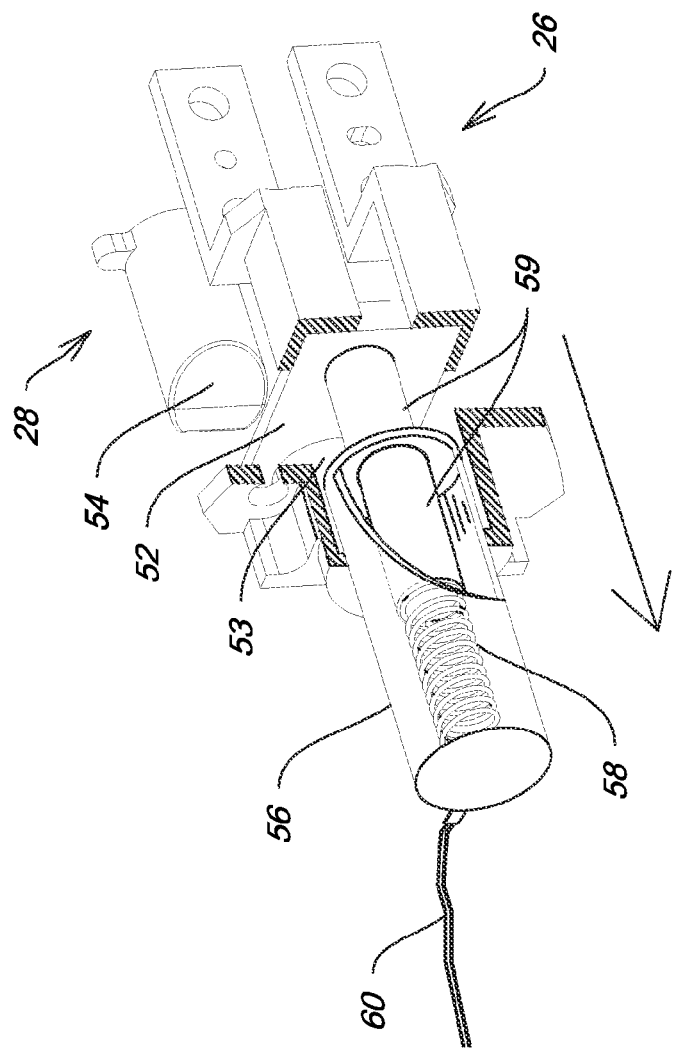
FIG. 11C depicts the solenoid in the activated position in which the internal spring is compressed and the plunger had detached the latch from the catch, thus unlocking the device.

FIGS. 11A-11C are close-up, more detailed views of latch and catch assembly 26+28, depicting the mechanism of engagement and disengagement of latch and catch assembly 26+28 and thus opening and closing of cover 10c. FIG. 11A is a cutaway view showing latch assembly 28 approaching catch assembly 26 as cover 10c is being closed. Latch assembly 28 primarily includes plunger 54. Catch assembly primarily includes catch plate 52 with precut aperture 53, linear solenoid/actuator 56, return spring 58, and electrical wire 60. When cover 10c is being closed, latch assembly 8 moves toward catch assembly 26 as indicated by the arrow in FIG. 11A. FIG. 11A further shows catch assembly 26 in a fully extended position.

FIG. 11B shows latch and catch assembly 26+28 in an engaged position (cover 10c is closed) with plunger 54 inserted into precut aperture 53 of catch plate 52. FIGS. 11A-11B also show return spring 58 in its equilibrium (expanded/extended) position where return spring 58 is expanded. Here, solenoid/actuator 56 does not have any electricity applied to it, so piston 59 is extended, due to the force of spring 58. With piston 49 extended, latch assembly 28 (specifically plunger 54) is engaged with catch assembly 26 (specifically in precut aperture 53), and cover 10c is locked in a closed position. When an electronic signal is received by linear solenoid/actuator 56, spring 58 contracts, as seen in FIG. 11C with the indicator arrow direction. This causes catch assembly 26 to retract away from latch assembly 28, in particular plunger 54. This mechanism occurs within cover end cap 42 and cover 10c.

FIG. 11C shows latch and catch assembly 26+28 in a disengaged position (cover 10c is not closed) with plunger 54 being disposed outside of precut aperture 53 and away from catch plate 52, thus allowing cover 10c to rotate and open. Spring 58 can be seen compressed, thus withdrawing catch assembly 26 (specifically catch plate 52 and precut aperture 53) and disengaging latch assembly 28 (specifically plunger 54). Specifically, the mechanism functions such that when the electric circuit is closed in solenoid 56 and electricity runs through it, piston 59 inside solenoid 56 is pulled inward causing spring 58 to be compressed. When piston 59 is pulled inwards, it also pulls catch plate 52 and causes it to disengage from plunger 54, which unlocks the device. Upon disengagement, spring 58 can return to its expanded equilibrium state.

As seen in FIGS. 10 and 11A-11C, electrical wire 60 is coupled to solenoid/actuator 56 and is capable of receiving an electrical signal to compress/expand internal spring 58 and retract/extend piston 59. The other end of electrical wire is coupled to circuit 73, as will be seen in FIGS. 12A-12B.

FIGS. 12A-12B are close-up, more detailed views of motor mechanism 50. Motor mechanism 50 primarily includes stepper motor 62, drive gear 64 mounted on stepper motor 62 via motor shaft 66. Motor shaft 66 is rotatably coupled to stepper motor 62, such that when stepper motor receives the appropriate electrical signal, motor shaft 66 rotates, thus rotating drive gear 64 in the direction of the arrows in FIGS. 12A-12B (gear 66 can rotate in both clockwise and counterclockwise directions to open and close cover 10c). Stepper motor 62 is mounted on motor bracket 68. As seen in FIG. 10, bracket 68 would be mounted at or near the end of base 10b. As such, in an embodiment, motor mechanism 50 would be positioned on the vehicle on which the device is installed.

Stepper motor 62 can cause rotation of drive gear 64 in preset "steps" or increments, such that cover 10c can open at a preset number of degrees (e.g., at 30°, 60°, 90°, 120°, 160°). Alternatively, stepper motor 62 can cause rotation of drive gear 64 at a continuous rate such that it can be stopped at any point. These types of rotations or mechanisms can be controlled by a programmable logic controller, for example in circuit 73. Circuit 73 will be discussed further as this specification continues.

As seen, electrical wire 60 is the same one as that coupled to solenoid/actuator 56 in FIGS. 11A-11C. When cover 10c is closed (latch and catch assembly 26+28 is engaged) and an electrical signal is received, solenoid/actuator 56 causes withdrawal/retraction of catch assembly 26 to disengage latch assembly 28. Then motor mechanism 50 is actuated to rotate drive gear 64 in a direction, which in turn will rotate the device's rotatable arm (including cover 10c) into an open position. Alternatively, when cover 10c is open (latch and catch assembly 26+28 is disengaged) and an electrical signal is received, motor mechanism 50 is actuated to rotate drive gear 64 in an opposite direction, which in turn will rotate the devices rotatable arm (including cover 10c) toward a closed position until latch assembly 28 engages catch assembly 26.

Power cord 71 may also be electrically coupled to motor mechanism 50 on one end and to a power source (not shown) (e.g., car battery) on the opposite end to power and control motor mechanism 50.

Circuit 73 may also be electrically coupled to motor mechanism 50 (e.g., via wire 75) and to solenoid/actuator 56. Circuit 73 may contain a radiofrequency receiver used to receive radio waves from a remote controller (not shown) for actuating and controlling motor mechanism 50 and solenoid/actuator 56. The remote controller can be any suitable remote controller known in the art. Thus, the device can be opened, closed, and controlled remotely. Receiver unit 73 may be positioned on hinge 16, as seen in FIG. 10.

Figure 13A:
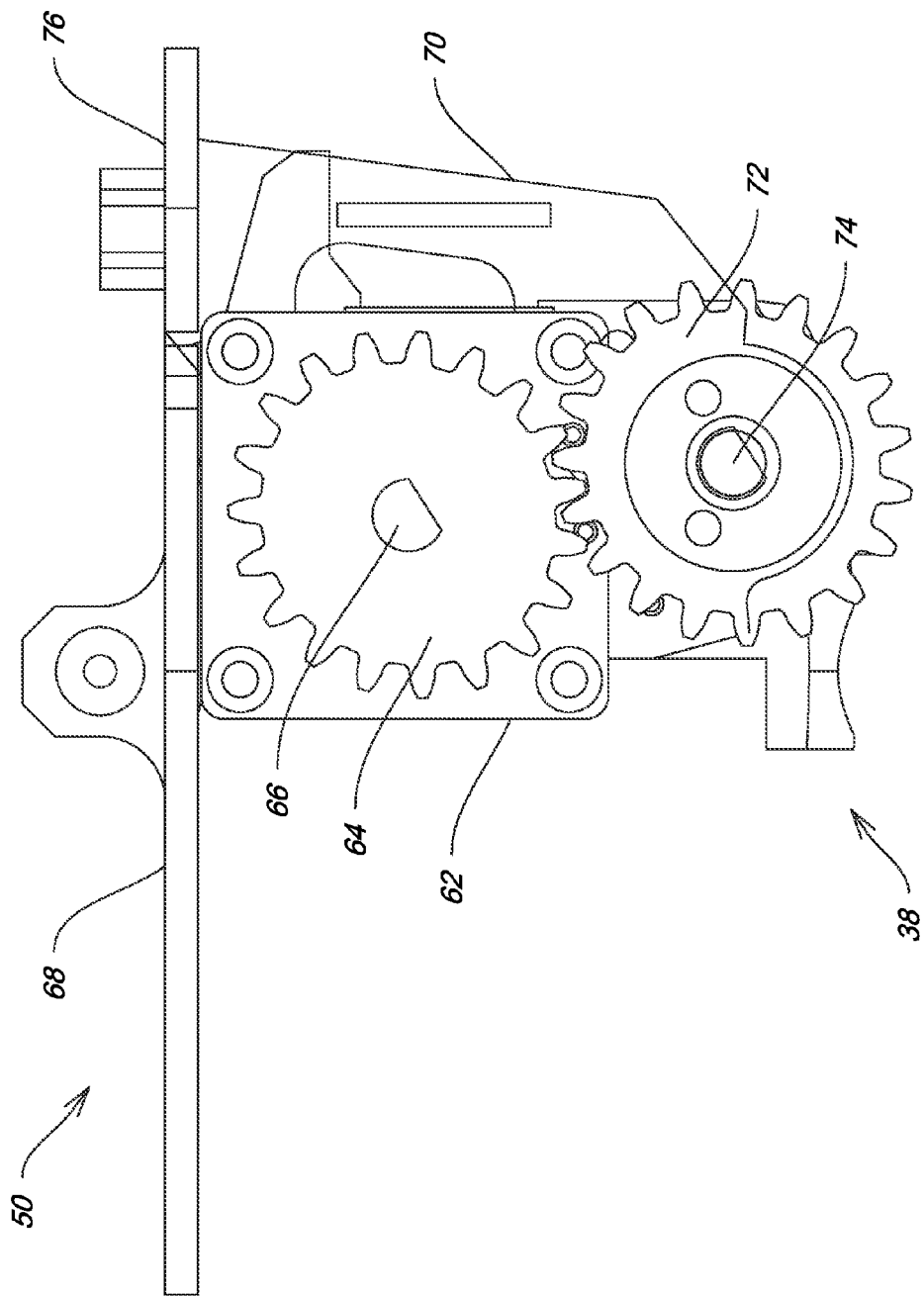
FIG. 13A is a top plan view of the novel hinge and motor mechanism when the novel apparatus is in its fully closed position.
Figure 13B:
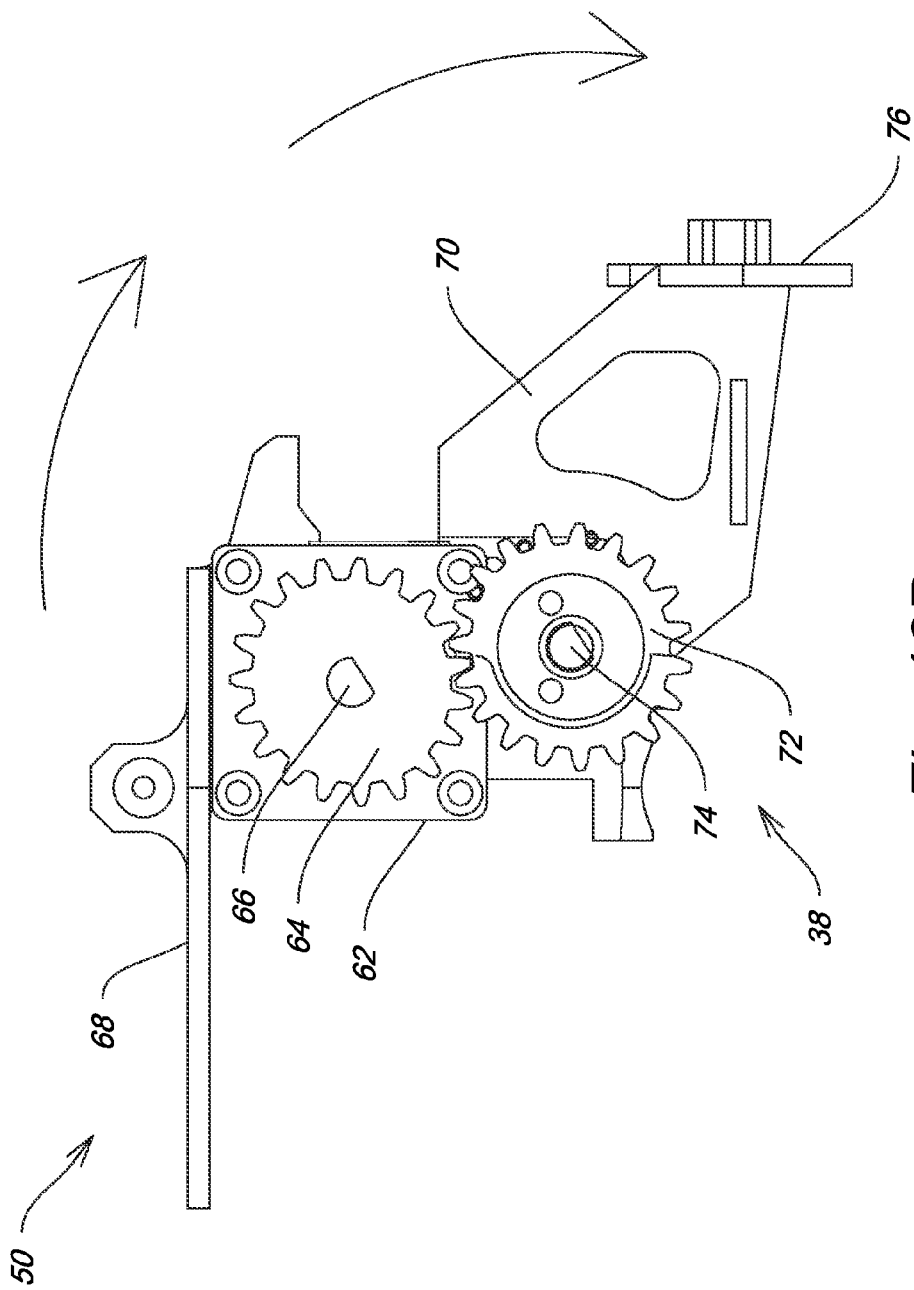
FIG. 13B is a top plan view of the novel hinge and motor mechanism when the novel apparatus is open about ninety degrees (90°) relative to its fully closed position.

FIGS. 13A-13C are close-up, more detailed, top views of hinge assembly 16+38, depicting the mechanism of rotation of arm plate 70, and thus opening and closing of cover 10c. The top of motor mechanism 50 can also be seen in the assembly. Hinge block 38 is rotatably mounted on mounting bracket 14 on the vehicle. Hinge block 38 primarily includes arm plate 70, driven gear 72 mounted on arm plate 70 via shaft 74, and hinge bracket 76. FIGS. 13A-13C show the relationship between stepper motor 62, drive gear 64, arm plate 70, and driven gear 72.

As can be seen, drive gear 64 engages driven gear 72, such that when drive gear 64 is actuated and rotates, driven gear 72 rotates as well. When driven gear 72 rotates, shaft 74 rotates, thus causing rotation of arm plate 70. FIG. 13A shows arm plate 70 in a closed position with drive gear 64 interlocked with driven gear 72. FIG. 13B shows arm plate 70 rotated about ninety degrees (90°) open from the closed position of FIG. 13A. The arrows of FIG. 13B indicate the direction of rotation of arm plate 70. FIG. 13C shows arm plate 70 rotated in a fully open position (e.g., 160° open from the closed position of FIG. 13A). The arrows of FIG. 13C again indicate the direction of further rotation of arm plate 70.

In an alternative embodiment, the output shaft of a two-direction motor, not depicted, may be secured to shaft 74 either directly or through a suitable speed-reduction means to enable a user to open and close housing cover 10c relative to stationary housing base 10b by switching the motor on and then selecting "open" or "close." The "open" setting would include a sub-setting of ninety degrees (90°) open or one hundred sixty degrees (160°) open, for example. No detents would be required in the motorized embodiment. There would be no need for a latch for holding the cover open nor would a latch release mechanism be required. A motorized version would be remotely activated to deploy the device.

GLOSSARY OF CLAIM TERMS

Catch and latch assembly: This term is used herein to refer to a device that can lock into place and unlock for movement of connected components.

Drive gear: This term is used herein to refer to a wheel or roller with grooves/teeth positioned along the circumference for engaging and rotating another gear (typically a driven gear).

Driven gear: This term is used herein to refer to a wheel or roller with grooves/teeth positioned along the circumference for engaging and rotating another gear (typically a driven gear).

Equilibrium position: This term is used herein to refer to the disposition of a structure when that structure is at rest (i.e., no forces acting on the structure). Thus, for example, when a catch assembly is extended in its equilibrium position, it will remain in that extended position until a force is applied to it to contract/compress it.

Hinge assembly: This term is used herein to refer to a jointed or flexible device or mechanism that allows an arm to pivot open and closed.

Internal spring: This term is used herein to refer to a typically-coiled device that has an inherent bias toward an equilibrium position when compressed or expanded. As used herein, the spring is positioned within the linear solenoid for pushing or retracting a piston.

Leading end: This term is used herein to refer to a relative position closer to the front end of the underlying vehicle.

Linear actuator: This term is used herein to refer to a mechanism that creates motion in a linear or straight line by switching on and off when receiving electrical signals.

Linear solenoid: This term is used herein to refer to a transducer that converts energy to create motion in a linear or straight line.

Motor mechanism: This term is used herein to refer to a machine or device that converts any suitable energy received into mechanical energy, thus effectuating motion in a connected structure.

Piston: This term is used herein to refer to a typically-cylindrical body slidably positioned within a similarly-shaped chamber or vessel, where the body can slide within the chamber or vessel as a result of a force being placed on it.

Plunger: This term is used herein to refer to a component of a latch that can be inserted into a catch or a precut aperture therein.

Radiofrequency receiver: This term is used herein to refer to an electronic device that receives a radio signal wirelessly and transmits that signal to another device for activating, deactivating, and/or controlling the other device.

Receiver: This term is used herein to refer to an electronic device that receives an electrical signal (wired or wirelessly) and transmits that signal to another device for activating, deactivating, and/or controlling the other device.

Stepper motor: This term is used herein to refer to a wheel or roller with grooves/teeth positioned along the circumference for engaging another gear and to be rotated by that other gear (typically a drive gear).

Trailing end: This term is used herein to refer to a relative position closer to the back end of the underlying vehicle.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. An apparatus that provides protection from precipitation if needed to a vehicle occupant upon entering or exiting from a vehicle, comprising:
   an elongate housing coupled to an exterior of said vehicle,
   said housing having a longitudinal axis parallel to a longitudinal axis of said vehicle,
   said housing secured to a roof of said vehicle near an edge of said roof in proximity to a vehicle door of said vehicle,
   said housing including a base and a cover each having a first end and a second end, wherein said first end of said base corresponds to said first end of said cover and wherein said second end of said base corresponds to said second end of said cover,
   said base secured to said vehicle roof;
   a hinge assembly positioned at said first ends of said base and said cover, said hinge assembly interconnecting said cover and said base,
   said housing having a fully closed position when said cover is fully engaged to said base,
   said housing having a fully open position when said cover is fully rotated with respect to said base, such that said cover rotates relative to said base during transition between said fully closed position and said fully open position;
   wherein in said fully closed position, said first end of said base is adjacent to said first end of said cover, and said second end of said base is adjacent to said second end of said cover,
   wherein in said fully open position, said first end of said base is adjacent to said first end of said cover, and said second end of said cover is outwardly rotated relative to said second end of said base,
   said base and said cover coupled to each other during said fully closed position, said transition, and said fully open position at said first ends thereof via said hinge assembly,
   said second end of said cover being free to rotate relative to said second end of said base during said transition,
   wherein said apparatus operates and said cover rotates through said hinge assembly;
   a catch and latch assembly including a catch and a latch,
   said latch engaging said catch when said housing is in said fully closed configuration;
   a sheet of waterproof material having a first end secured to an interior of said base and a second end secured to an interior of said cover,
   said sheet being in a stored configuration when said housing is in said fully closed position, said sheet being fully deployed when said housing is in said fully open position; and
   a motor mechanism positioned in communication with said hinge assembly for mechanically opening and closing said housing without force from said vehicle occupant.

2. The apparatus of claim 1, further comprising:
   said first end of said waterproof material secured to an elongate rod disposed within said interior of said base, and
   said second end of said waterproof material secured to an elongate rod disposed within said interior of said cover.

3. The apparatus of claim 1, further comprising:
   said catch and latch assembly positioned at a trailing end of said housing, said trailing end of said housing corresponding to a trailing end of said vehicle, and
   said hinge assembly positioned at a leading end of said housing, said leading end of said housing corresponding to a leading end of said vehicle.

4. The apparatus of claim 3, further comprising:
   said catch secured to said base, and
   said latch secured to said cover.

5. The apparatus of claim 1, further comprising:
   said catch and latch assembly including a linear actuator for engaging and disengaging said catch and said latch.

6. The apparatus of claim 5, further comprising:
   said linear actuator in electrical communication with said motor mechanism, such that when said linear actuator is actuated, said motor mechanism is activated for opening or closing said housing.

7. The apparatus of claim 5, further comprising
   said linear actuator being a linear solenoid.

8. The apparatus of claim 7, further comprising:
   said linear solenoid including an internal spring and a piston coupled to each other, said internal spring having an extended position where said piston is also extended and a retracted position where said piston is also retracted, wherein said internal spring has an equilibrium position in said extended position.

9. The apparatus of claim 8, further comprising:
said latch including a plunger that engages and extends through a precut aperture in said catch when said internal spring and said piston are extended.

10. The apparatus of claim 1, further comprising:
said motor mechanism including a drive gear,
said hinge assembly including a driven gear,
said drive gear engaging said driven gear when said motor mechanism is activated, such that when said driven gear rotates as a result of said drive gear rotating and engaging said driven gear, said cover rotates between said fully open and closed positions.

11. The apparatus of claim 10, further comprising:
said motor mechanism including a stepper motor.

12. The apparatus of claim 11, further comprising:
said stepper motor causing rotation and stopping of said cover at preset increments between said fully open position and said fully closed position, said preset increments set by a programmable logic controller.

13. The apparatus of claim 1, further comprising:
a receiver electrically coupled to said motor mechanism for receiving a signal from a remote controller that is in communication with said receiver.

14. The apparatus of claim 1, further comprising:
said receiver being a radiofrequency receiver, such that said housing can be opened and closed remotely.

15. An apparatus that provides protect on from precipitation if needed to a vehicle occupant upon entering or exiting from a vehicle, comprising:
an elongate housing coupled to an exterior of said vehicle,
said housing having a longitudinal axis parallel to a longitudinal axis of said vehicle,
said housing secured to a roof of said vehicle near an edge of said roof in proximity to a vehicle door so that said housing can be reached by said vehicle occupant seated within said vehicle,
said housing including a hollow base and a hollow cover each having a first end and a second end, wherein said first end of said base corresponds to said first end of said cover and wherein said second end of said base corresponds to said second end of said cover,
said hollow base secured to said vehicle roof;
a hinge assembly positioned at said first ends of said base and said cover, said hinge assembly interconnecting said hollow cover and said hollow base,
said housing having a fully closed position when said hollow cover is fully engaged to said hollow base,
said housing having a fully open position when said hollow cover is fully rotated with respect to said base, such that said cover rotates relative to said base during transition between said fully closed position and said fully open position;
wherein in said fully closed position, said first end of said base is adjacent to said first end of said cover, and said second end of said base is adjacent to said second end of said cover,
wherein in said fully open position, said first end of said base is adjacent to said first end of said cover, and said second end of said cover is outwardly rotated relative to said second end of said base,
said base and said cover coupled to each other during said fully closed position, said transition, and said fully open position at said first ends thereof via said hinge assembly,
said second end of said cover being free to rotate relative to said second end of said base during said transition;
a sheet of waterproof material having a first end secured to a hollow interior of said hollow base and a second end secured to a hollow interior of said hollow cover,
said sheet being in a stored configuration when said housing is in said fully closed position, said sheet being fully deployed when said housing is in said fully open position, said sheet having a semi-circular configuration in said fully open position,
said first end of said waterproof material secured to an elongate rod disposed within said interior of said hollow base,
said second end of said waterproof material secured to an elongate rod disposed within said interior of said hollow cover;
a catch and latch assembly including a catch and a latch,
said catch secured to a trailing end of said base, said latch secured to a trailing end of said cover, said latch engaging said catch when said housing is in said fully closed configuration,
said catch and latch assembly positioned at a trailing end of said housing, said trailing end of said housing corresponding to a trailing end of said vehicle, said hinge assembly positioned at a leading end of said housing, said leading end of said housing corresponding to a leading end of said vehicle,
said catch and latch assembly including a linear solenoid for engaging and disengaging said catch and said latch to each other;
a plurality of fabric support rods extending radially from said hinge assembly to support said sheet from sagging between said base and said cover, wherein said fabric support rods deploy during said transition between said fully closed position and said fully open position; and
a motor mechanism positioned in communication with said hinge assembly for mechanically opening and closing said housing without force from said vehicle occupant, said motor mechanism including a stepper motor that causes rotation and stopping of said cover at preset increments between said fully open position and said fully closed position, said preset increments set by a programmable logic controller,
said linear solenoid in electrical communication with said motor mechanism, such that when said linear solenoid is actuated, said motor mechanism is activated for opening or closing said housing,
said linear solenoid including an internal spring and a piston coupled to each other, said internal spring having an extended position where said piston is also extended and a retracted position where said piston is also retracted, wherein said internal spring has an equilibrium position in said extended position,
said latch including a plunger that engages and extends through a precut aperture in said catch when said internal spring and said piston are extended,
said motor mechanism including a drive gear, said hinge assembly including a driven gear,
said drive gear engaging said driven gear when said motor mechanism is activated, such that when said driven gear rotates as a result of said drive gear rotating and engaging said driven gear, said cover rotates between said fully open and closed positions; and
a receiver electrically coupled to said motor mechanism for receiving a signal from a remote controller that is in communication with said receiver,
said receiver being a radiofrequency receiver, such that said housing can be opened and closed remotely.

16. The apparatus of claim 1, wherein said sheet of waterproof material has a semi-circular configuration in said fully open position of said housing.

17. The apparatus of claim 1, further comprising:
a plurality of fabric support rods extending radially from said hinge assembly to support said sheet from sagging between said base and said cover, wherein said fabric support rods deploy during said transition between said fully closed position and said fully open position.

* * * * *